Sept. 16, 1969  N. H. STONER  3,466,852

DISPOSABLE HORSE BLANKET AND GIRTH SHEATH

Filed Jan. 6, 1967

INVENTOR
NORMAN H. STONER

BY Huebner & Kurlandsky
ATTORNEY 3,466,852
Patented Sept. 16, 1969

3,466,852
DISPOSABLE HORSE BLANKET AND GIRTH SHEATH
Norman H. Stoner, 5391 S. 9th St., Kalamazoo, Mich. 49001
Filed Jan. 6. 1967, Ser. No. 607,843
Int. Cl. B68c 1/12
U.S. Cl. 54—65          3 Claims

ABSTRACT OF THE DISCLOSURE

A disposable protective article is provided for domestic animals such as horses upon which harness devices such as saddles are mounted. The protective article may be a saddle blanket, a girth sheath, or a similar device, and has a structure comprising a plastic film having a crinkled parchment sheet affixed to at least one and preferably both surfaces thereof. The protective article absorbs sweat from the animal, prevents the transmission of the sweat to the saddle or strap, and is sufficiently inexpensive to be discarded after a single use, thereby preventing the spreading of disease and infections from one animal to another.

Background and brief summary of the invention

Cloth saddle blankets and protective hardness sheaths have been traditionally used for absorbing sweat and preventing the saddle or harness from irritating the skin of the animal. Such articles have generally been suitable for the intended purpose. However, they have several disadvantages. First, they must be washed periodically. Second, the sweat from the animal often penetrates through the blanket and may soil or damage the saddle. Further, it has been found that when saddle blankets or girth sheaths are transferred from one animal to another, disease or infection may be communicated or transferred from one animal to another.

It is an object of the invention to provide a protective article for use with harness devices such as saddles, which article protects the animal from irritation by the harness device in question. It is a further object to provide such an article which is highly absorbent of sweat from the animal, and which is so designed that transmission of the animal sweat to the harness or strap is prevented. It is a primary object of the invention to provide an article of the type described which is sufficiently inexpensive that it may be discarded after a single use, thereby preventing transmission of disease and infection from one animal to another. The accomplishment of the foregoing and additional objects will become more fully apparent hereinafter.

According to the invention, a protective article for animals, as for example saddle blankets or girth sheaths, is provided and prepared from materials sufficiently inexpensive so that the articles may be discarded after a short period and even after a single use. As a result, the spreading of disease and infection from one animal to another is prevented. The article of the invention is prepared as a laminated structure comprising a plastic film having at least one and preferably two paper sheets affixed to the surfaces thereof. The paper is a water absorbent material and absorbs the sweat from the animal. The plastic film prevents transmission of the sweat to the saddle or strap.

Detailed description

Reference is now made to the accompanying drawings for a better understanding of the invention, wherein all the parts are numbered and wherein the same numbers are used to refer to corresponding parts throughout.

Figure 1:
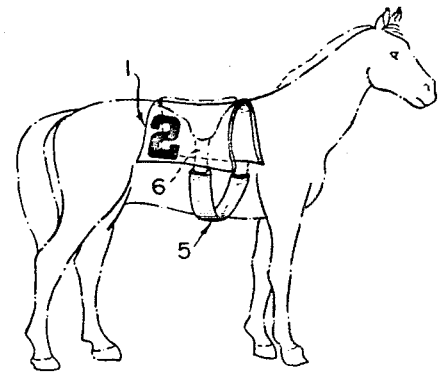
FIG. 1 is a side elevational view showing a horse having a saddle mounted thereon, and showing a horse blanket according to the invention positioned under the saddle and a girth sheath mounted over the girth strap.
Figure 2:
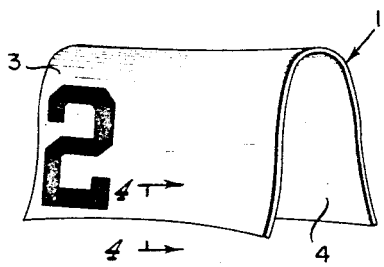
FIG. 2 is a perspective view of a horse blanket according to the invention.
Figure 4:
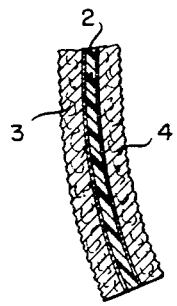
FIG. 4 is a fragmentary cross-sectional view taken at the line 4—4 of FIG. 2.

In FIGS. 1, 2 and 4 a horse blanket 1 is shown. The blanket is designed to be placed upon the back of the horse with the saddle mounted over the blanket, as shown in FIG. 1. As shown in FIG. 4, the blanket has a laminated structure and is formed from a plastic sheet 2 having paper sheets 3 and 4 afixed to the surfaces thereof. Alternatively, only a single paper layer may be used if desired, the paper layer being placed in contact with the animal to absorb sweat, and the plastic layer serving to strengthen the blanket and to prevent the transmission of sweat to the saddle.

Figure 3:
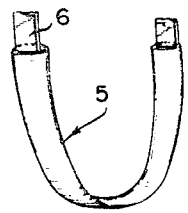
FIG. 3 is a perspective view of a girth sheath.
Figure 5:
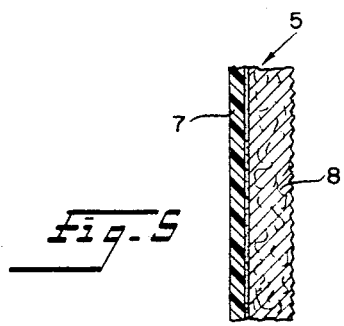
FIG. 5 is a fragmentary cross-sectional view of the girth sheath shown in FIG. 3.

FIGS. 3 and 5 illustrate a girth sheath 5 which is in the form of a sleeve, having a girth strap 6 disposed therein. The girth sheet 5 is prepared from a plastic film 7 having a paper layer 8 affixed to the surface thereof. The paper layer may also be but preferably is not, present on both surfaces thereof.

Various plastic films may be used to form the article of the invention, such as those of polyethylene, polypropylene, polyvinylchloride, Mylar, etc. Polyethylene is the preferred material. The plastic film may be of various thicknesses. A ¾ mil sheet has been found to be especially suitable for the preparation of horse blankets.

The paper material may be of various forms. It should be rather bulky and water absorbent. Crinkled parchment paper has been found to be highly satisfactory and is sufficiently inexpensive to be discarded after a single use. Laminated blankets of crinkled parchment are, moreover, sufficiently strong, flexible, and elastic to fit neatly over the body contours of the horse to be saddled, and to endure the rigorous treatment of riding and racing without tearing, ripping, or bursting, despite the economy of the item. When two sheets of paper are used, they should each preferably be of about 35 lb. weight. When a single sheet is used, it may be thicker. The saddle girth sheath may be formed from a single sheet of 35 lb. crinkle parchment.

The laminated material of the present invention may be formed with standard laminating equipment. It is then sheeted and printed on a flat board press, if desired.

The saddle girth sheath may be fabricated from a single sheet of 35 lb. crinkle parchment on a bag machine, for example, from a single roll of ten inch wide paper glued to form a tube 4½ inches wide by 48 inches long. The saddle girth may be slid through the tube. After use, both the saddle blanket and the girth sheath may be thrown away to prevent the spread of infection from one animal to another.

When the weight of paper is referred to herein in pounds, this is to be understood as having its usual meaning, namely, pounds per 3,000 square foot ream (24" x 36" x 500).

It is to be understood that the invention is not limited to the exact details of construction, operation, or exact materials or embodiments shown and described, as obvious modifications and equivalents will be apparent to one skilled in the art.

I claim:
1. A lightweight disposable protective article for an animal upon which a harness device is mounted, adapted to be interposed between the surface skin of said animal and said harness device, said protective article comprising a sweat-repellent plastic film having a sheet of water absorbent crinkled parchment affixed to each surface thereof, said protective article being flexible and adapted to prevent the transmission of animal sweat to a harness device.

2. A disposable article according to claim 1, comprising two sheets of crinkled parchment of about 35 pound weight laminated together by a polyethylene sheet of about ¾ mil thickness.

3. A protective device of claim 1, wherein the plastic film is selected from the group consisting of polyethylene and polypropylene sheets and wherein said protective device is adapted for use as a saddle blanket or girth sheath.

References Cited

UNITED STATES PATENTS

| | | | |
|---|---|---|---|
| 604,567 | 5/1898 | McClain | 54—65 |
| 1,239,478 | 9/1917 | Hanisch | 54—79 |
| 1,678,373 | 7/1928 | Wiesenfeld | 54—23 |
| 2,834,347 | 5/1958 | Connally | 128—284 |
| 3,065,751 | 11/1962 | Gobbo et al. | 128—287 |
| 3,192,927 | 7/1965 | Chauriere | 128—287 |

HUGH R. CHAMBLEE, Primary Examiner

U.S. Cl. X.R.

54—41, 66, 79